Feb. 27, 1934.  R. LAPSLEY  1,948,723
TRANSMISSION
Filed Jan. 19, 1929  6 Sheets-Sheet 2

Inventor
Robert Lapsley
By Brown Jackson Boettcher & Dienner
Attys.

Feb. 27, 1934.   R. LAPSLEY   1,948,723
TRANSMISSION
Filed Jan. 19, 1929   6 Sheets-Sheet 6

Inventor
Robert Lapsley
Attys

Patented Feb. 27, 1934

1,948,723

UNITED STATES PATENT OFFICE 1,948,723

TRANSMISSION

Robert Lapsley, Detroit, Mich., assignor to Clark Equipment Company, Buchanan, Mich., a corporation of Michigan Application January 19, 1929. Serial No. 333,686

33 Claims. (Cl. 74—57)

My invention relates to transmissions for automobiles and the like, and is more particularly concerned with transmissions having internal gear reductions for providing a quiet reduction suitable for continuous drive.

Transmissions employing a double internal gear reduction are known. As heretofore constructed, they have been difficult and expensive to manufacture. The gear case and its various bearing supports or brackets have been difficult and expensive to machine and have required difficult and intricate core work and difficult castings. The designs heretofore employed have failed to provide proper bearing supports for the gears, with resultant undesirable noise and wear.

According to my invention the casing is simplified and reduced in cost. The casings of the prior art have required certain machining operations to be concentric and others to be eccentric. This is particularly difficult where eccentric and concentric bores are required to be machined.

According to my invention, nothing but simple concentric bores are required in the casing, and they are of progressively varying diameters, so that they may all be finished at a single operation if desired. The way in which I am able to do this, and make up a satisfactory mounting for the eccentric sleeve, is to break the casing and bearing support or bracket into two separate elements which have as their line of cleavage a concentric bore which is preferably cylindrical.

The main casing then has only concentric bearing seats and a concentric seat for the eccentric bearing element or bearing bracket. The eccentric bearing element, which I term the bearing bracket, has an outside cylindrical face to enter the corresponding seat in the casing, and has two internal eccentric bores forming bearings or bearing seats.

This construction permits me to secure another important advantage heretofore unattainable, and that is to support the internal gear sleeve externally at both ends in solid bearings with the center line of the gear teeth of the sleeve, both internal and external, lying between the supporting bearings. The gears thus have no overhang.

The bearing bracket is preferably made of steel suitable to receive the roller bearings which support the internal external gear sleeve, i. e., it is of suitable character to be hardened and ground to form the outer bearing races. The strength which can thus be provided is highly desirable for permitting the supporting ring or race for the rearmost eccentric bearing to be supported through the crescent-shaped opening between the gear sleeve and the larger internal gear.

A further feature of importance of my invention is the provision of a system of oiling the internal external gear assembly and the bushing for the loose pinion for the first internal gear. The low speed pinion and the low speed gear on the lay shaft carry oil into a housing which tends to trap the oil and feed it into the internal external gear assembly and the bearings and gears thereof. Also oil is constantly fed to the bushing or bearing of the loose gear pinion on the intermediate shaft, which is subject to motion much of the time.

A still further feature of importance of the present invention is in the provision of an improved mounting and manner of positioning the loose pinion for the first internal gear of the internal external gear assembly. The mounting supports this pinion adjacent and at the same time free or independent of the shiftable intermediate shaft section.

The transmission of my invention provides an easy and compact assembly of highly desirable character. Direct drive is carried straight through on roller bearings, a very desirable feature.

Transmissions of the so-called 4-speed internal gear type are now on the market. They provide generally two stages of spur gears for acceleration, and a stage of internal gear and a direct drive for continuous running.

While in the preferred form of my invention I provide a like number of driving ratios, I arrange the transmission stages or ratios on a different theory. The lowest stage or ratio of spur gears is not intended to be employed for acceleration in normal driving, but is an emergency low gear for heavy pulling.

The second gear stage is a spur gear drive and is employed for starting and acceleration. It corresponds to the usual first gear of known standard spur gear transmissions.

My third stage is an internal gear drive which is used both for an accelerating gear to the direct drive, or it may be used as a continuous drive at a ratio permitting of rapid acceleration in traffic.

In conjunction with this mode of arranging the gears, I provide a novel control. The gear shift is standard for low, reverse, intermediate (internal) and high (direct). The emergency low is held out by a spring plunger which must be overcome by a separate movement. This feature of the shifting elements is of course applicable to other forms of transmission, and the shifting element which is normally out of selective position may be reverse or any other special connection, such as a power take-off or the like.

There are other features of novelty of my invention which will be apparent from the following detailed description and illustration of a specific embodiment.

The shaft 1 is adapted to be driven by the engine through the interposition of a suitable clutch or the like. The shaft 2, which extends out of the rear end of the main housing 3, is adapted to be connected to the propeller shaft of the automobile or other vehicle, or the like. Five possible driving connections can be made through the transmission, namely, an emergency low drive, which provides a maximum gear reduction in the transmission, and which is to be used only in pulling out of a hole or pulling a heavy load. The next drive is through what is known as first speed, which is a spur gear reduction less in amount. Next is an internal gear reduction through a double internal drive corresponding to second speed. This is of less reduction than the previous reduction and is suitable for continuous drive, if desired.

There is a direct drive or high speed drive in which the shafts 1 and 2 are connected together at a 1 to 1 ratio by direct connection. This corresponds to normal high or direct drive. In addition, there is a reverse drive including a gear reduction preferably lying between the emergency low and the first gear.

The main casing 3 is open at the bottom where a suitable pan 4 of sheet metal is provided. This pan has a flange 5 about the edge thereof to adapt it to be bolted to the bottom of the transmission housing 3, this transmission housing having a suitable flat space and including flanges, such as 6—6 along the sides (see Figs. 2 and 3). The opening in the bottom permits the lay shaft sleeve and gears to be introduced from the bottom. The casing 3 has an opening at the top which is faced off to receive the cover plate 7, containing the three shifter rods 8, 9 and 10, said shifter rods being suitably guided in bearings at the front and rear of the cover plate 7, as indicated at 12 and 13 in Fig. 1. The joint at 14 between the cover plate 7 and the main housing 3 is made preferably by bolting the parts together, the joining surface being a plane.

The main housing 3 is faced off flat at the front end, as indicated at the surface 15, to provide a joint between it and the flange 16 of the front cap 17. This cap 17 has a tubular sleeve 18 extending forwardly about the shaft 1.

It may contain a felt or like packing in the annular recess 19, and is provided with oil trapping grooves 20 at its inner end. The cap 17 has an inwardly extending cylindrical flange 22, and this flange is machined on its outer peripheral surface to fit within the bore 23 in the front wall of the casing 3.

An internal cylindrical seat 24 is adapted to receive the outer race 25 for the ball bearings 26, the inner race of the bearings embracing the enlargement 28 of the shaft 1. The cap 17 has an inwardly extending wall 29 forming a housing 30 (see Fig. 2) about the bearings 26 and the low speed pinion 31, which is formed as an integral part of the inner end of the driving shaft 1. The inner end of the driving shaft 1 is bored out and splined, as indicated at 32, the bore 33 communicating by way of one or more drilled passageways 34 with the annular recess 35 in the cap 17, which recess communicates with the ball bearings 26 and communicates through a cored passageway 36 with the lower part of the casing 3, to permit lubricant, such as heavy oil, which is employed within the case, to drain back towards the bottom of the case.

The lower part of the main casing 3 has horizontal bores at 37 and 38 to receive the rod or shaft 39 which supports the lay shaft sleeve 40. The lay shaft sleeve 40 has a bronze bushing 42 at its front end embracing the rod 39 and forming a bearing thereupon. In like manner the rear end of the lay shaft sleeve 40 has a bronze bushing 43 providing a bearing on the rod 39 at the rear end of the sleeve.

The sleeve 40 is guided endwise by the bosses 44 and 45, passageways, however, being provided at 46 and 47 to permit the entry of oil to said bushings 42 and 43 to keep the same thoroughly lubricated.

Figure 2:
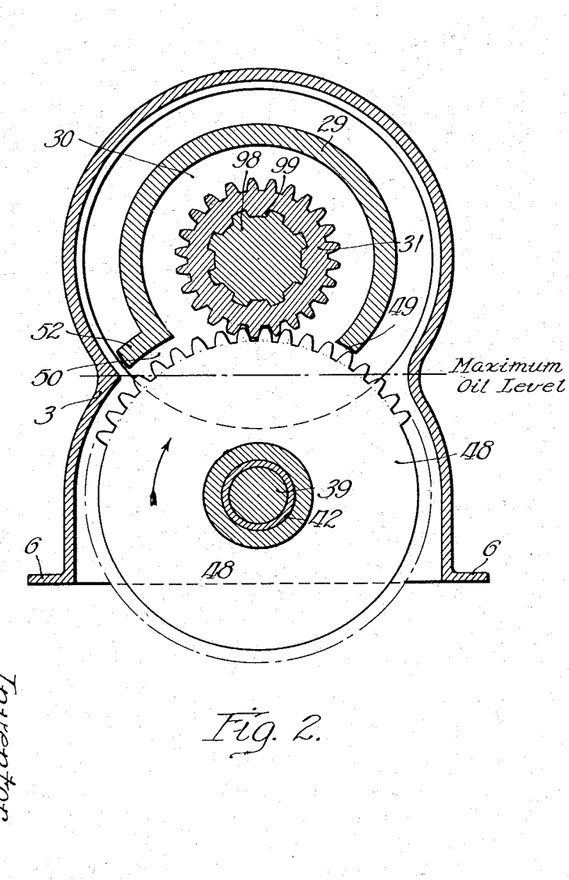
Fig. 2 is a transverse section taken on the line 2—2 of Fig. 1.

The lay shaft sleeve 40 bears at its front end the integral low speed gear 48 which meshes with the low speed pinion 31. The upper end of the slow speed gear 48 projects up through the bottom of the housing 30 provided by the flange 29, as shown in Fig. 2, the flange being continuous over the upper part of the low speed pinion 31 and extending in close proximity, as indicated at 49 in Fig. 2, to the tips of the teeth on the low speed gear 48. The other end of the flange 29 extends to a point slightly further from the line of the teeth on the low speed gear 48 to provide an inlet passageway 50 for oil to be carried up by the low speed gear and trapped in the housing 30. The flange 29 has an extension at 52 approaching the shell of the main case 3, so as to facilitate the carrying of oil by the gear 48 up into the housing 30 about the low speed pinion 31.

The main casing 3 has an integral bracket 53 which is bored out on a concentric bore 54 with the bore 23 and of slightly smaller diameter than the bore 23. The main casing 3 also includes the bearing bracket 55, which is bored out on a cylindrical bore 56 concentric with the bores 54 and 23. The rear wall 57 of the main housing 3 is bored out with a cylindrical concentric bore 58 to receive the outer race 59 of the ball bearings 60, the inner race 62 of which supports the rear end of the driven shaft 2.

A suitable flanged cap or plate holds the outer race 59 against a spring expanding plate ring 63, which is seated in a groove in the bore 58. The bearing bracket 55 supports the outer race 64 of the bearings 65, the inner race of which 66 embraces the tubular sleeve 67, which tubular sleeve forms an extension of the driven shaft 2 and bears at its inner end the internal external gear member 68. The said inner race 66 is held in place by a snap ring 69, the other side of the race 66 resting against the radially extending portion.

The rear end of the sleeve member 67 is splined as indicated at 70 to receive the shiftable gear 72 which is likewise splined and movable axially on the sleeve member 67. The gear member 72 has a shifter collar 73 engaged by the shifter fork 74 formed on the shifter arm 75, the hub 76 of which is pinned as by the taper screw pin 77 upon the sliding shifter rod 9. The lay shaft sleeve 40 carries at its rear end two pinions 78 and 79. Pinion 78 has teeth which are adapted to be engaged by the teeth of the shifting gear 72 for transmitting drive from the lay shaft 40 to the driven shaft 2. The pinion 79 is in constant mesh with the idler pinion 80, which idler pinion 80 is so disposed as to have its pitch circle tangent to the pitch circle of the shifting gear 72, so that the shifting gear 72 and idler pinion 80 may be meshed for reverse drive of the driven shaft 2.

Figure 1:
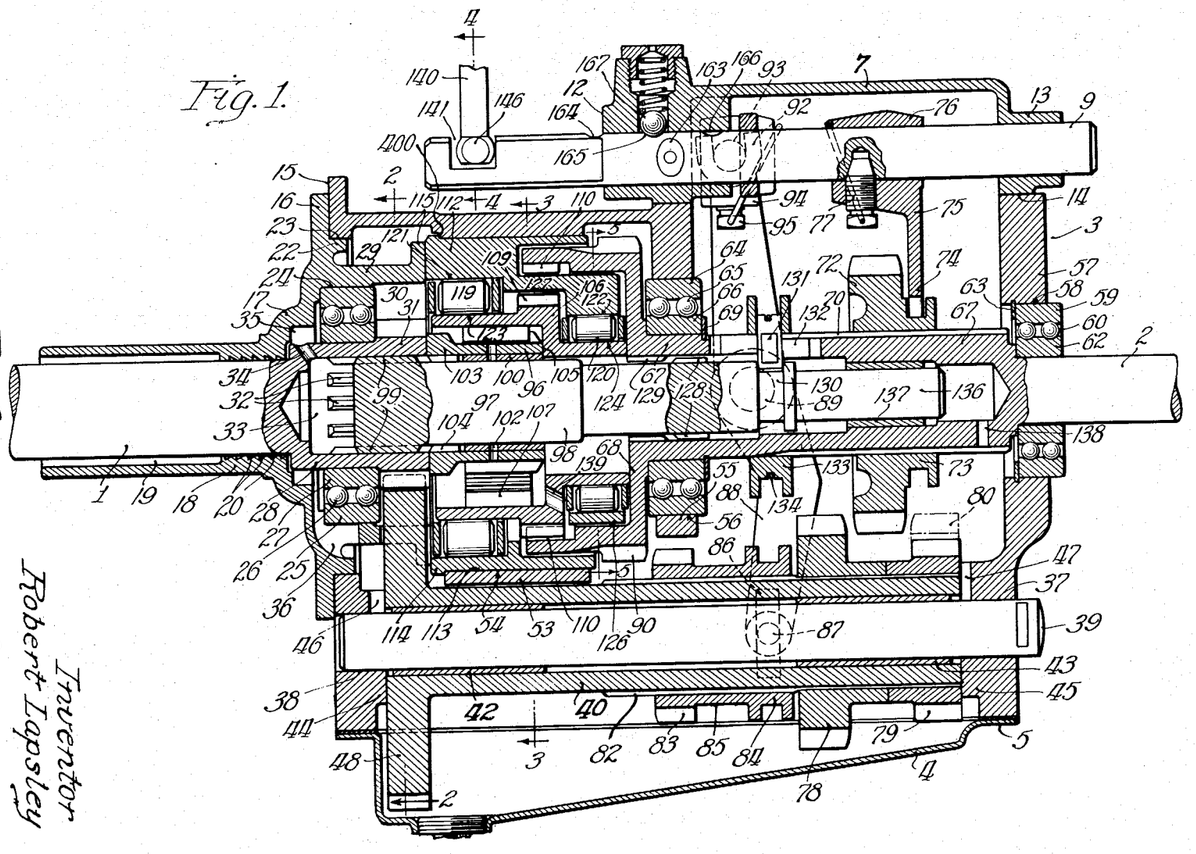
Fig. 1 is a longitudinal vertical section through a transmission embodying my invention.

The lay shaft sleeve 40 is provided with splines 82 upon which is mounted the pinion 83, said pinion having a shifting collar 84 integral with the hub 85. A shifter finger 86, shown in dotted lines in Fig. 1, is pivotally mounted at 87 on the lower arm of a shifter lever 88. This finger 86 lies in the groove in the shifter collar 84 and is adapted to move the teeth of the gear 83 endwise into or out of mesh with the gear teeth of the external gear 90 on the member 68.

The shifter lever 88 is pivoted at 89 to the side wall of the casing, and the upper arm of said lever 88 is connected by a fork 92, shown in dotted lines in Fig. 1, with a pin 93 mounted on the shifter rod 8. The shifter rod 8 lies back of the shifter rod 9 in Fig. 1. The pin 93 is mounted upon a hub member 94 which is connected to the rod by the taper screw pin 95.

A driving pinion 96, lying axially in line with the low speed pinion 31, is journaled upon the enlarged cylindrical part 97 of intermediate shaft 98. This intermediate shaft 98 has splines 99 at its front end meshing at all times with the splines 32 on the inside periphery of the hollow part of the driving shaft 1. The pinion 96 is mounted upon the bushing 100, preferably of bronze or other anti-friction metal, and an oil duct or passageway 102 is drilled through the pinion 96 and through its bushing 100 to permit oil to be forced to the inside of the bushing 100.

The pinion 96 has a collar 103 at its forward end, which collar is adapted to engage endwise against the end of the low speed pinion 31. Internally, the collar 103 has splines 104 which are adapted to be engaged by the splines 99 on the forward end of the intermediate shaft 98. At its rear end the pinion 96 engages the radial face 105 of the internal external gear sleeve 106. This internal external gear sleeve 106 has an internal gear 107 disposed between its forward edge and the radial face 105. The teeth of the gear 107 mesh with the teeth of the pinion 96 at all times, the sleeve member 106 being eccentrically mounted so as to bring the pitch circle of the gear 107 tangent to the pitch circle at the top of the pinion 96, as will be apparent from an inspection of Figs. 1 and 3.

The sleeve member 106 is provided with an external gear 109, the teeth of which mesh with the teeth of the internal gear 110 mounted on the member 68. The mesh of these two gears 109 and 110 is at the bottom. The member 68, and hence the gear 110, being integral with the driving shaft 2, it can be seen that when the splines 99 of the intermediate shaft 98 are slid into mesh with the splines 104 on the inside of the collar 103 of the pinion 96, a double internal gear reduction is secured as between the driving shaft 1 and the driven shaft 2.

The eccentric support for the member 106 is provided by the supporting bracket member 112. This member 112 comprises a cylindrical body of metal having a peripheral cylindrical face 113 matching the cylindrical bore 54 of the integral bracket member 53 in the case 3. The member 112 has a slight shoulder 114 which locates the member 112 accurately endwise in the integral bracket 53. The shoulder or flange 114 is of a diameter large enough to be passed through the bore 23 in the front wall of the gear housing 3. The member 112 fits snugly in the bore 54 and is held in place by the extending flange 115 on the rear end of the circular flange 29, which is a part of the cap member 17.

The member 112 is held against rotation by a pair of pins 116 engaging in recesses 117 in the member 112, said pins being mounted on the ends of screws 118. The screws 118 are shown as being positioned diametrically opposite and are preferably threaded obliquely rearwardly through the case 3 with the pins or ends 116 directed obliquely rearwardly into the recesses 117 and adapted for holding the shoulder 114 of member 112 against the end of brackets or at least against unintentional outward displacement.

This bracket member 112 is preferably made of a high grade alloy steel so as to be capable of serving as a race for the roller bearings 119 and 120 which lie directly between the finished internal surfaces 121 and 122 and the finished cylindrical external surfaces 123 and 124 on the sleeve member 106.

The one-piece bracket member 112, at its forward part, comprises a concentric ring, thicker at the top than at the bottom, and at its rear part comprises a ring of even thickness all the way around. Intermediate these parts there is a concentric bore in which the external gear 109 of the member 106 lies.

Figure 3:
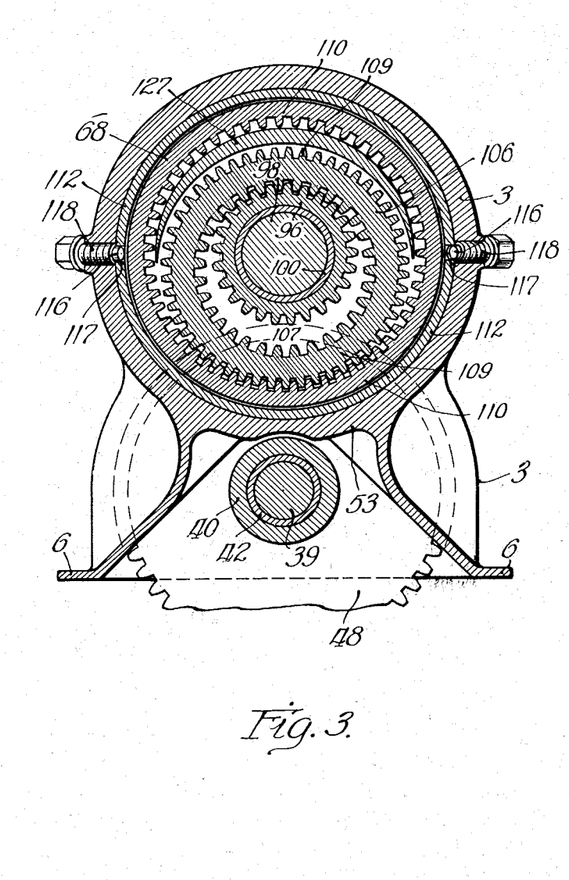
Fig. 3 is a transverse section taken on the line 3—3 of Fig. 1.

It will be seen that there is a crescent-shaped opening or space between the external gear 109 and the internal gear 110 (see Figs. 1 and 3). The eccentric ring 126, which provides the internal bearing ring surface 122, is supported by the solid crescent-shaped bracket portion 127 of the member 112. While the thickness of the said bracket portion 127 is not great, the crescent shape thereof and the character of the material, i. e., high grade alloy steel, provide ample strength for supporting the eccentric bracket ring 126 forming the outer bearing race for the roller bearings 120.

The intermediate shaft 98 has splines 128 along its central portion which are of an outer diameter not greater than the large cylindrical portion of 98. These splines are adapted to engage cooperating splines 129 formed on the inside of the sleeve member 67 upon which the internal external large gear member 68 is formed.

The intermediate shaft 98 has a shifting groove 130 lying inside the hollow sleeve member 67. This groove 130 is engaged by a pin 131 extending through a hole in a shifter collar 133 and through a slot 132 in the sleeve member 67. The pin 131 is slabbed off at the sides to engage the side walls of the slot 132 to keep the same from rolling or turning. The pin is held in position by a wire or rivet 134 lying in a small groove in the bottom of the groove of the shifter collar. The pin obviously may be threaded into the shifter collar 133.

A shifter fork, like the fork 74 and arm 75, is mounted on the rod 10, said fork being engageable with the groove in the collar 133 and, by movement endwise of the rod 10, being capable of shifting the intermediate shaft 98 endwise to clutch together on motion to the left as viewed in Fig. 1 the splines 128 and 129 for direct drive, or to clutch together the splines 99 and 104 by motion of the intermediate shaft to the right, as viewed in Fig. 1.

The rear end of the intermediate shaft 98 has a reduced bearing portion 136 closely fitting in the bushing 137 mounted on the inside of the sleeve member 67.

The sleeve member 67, at its lefthand end as viewed in Fig. 1, opens into the inside of the internal external gear member 68, and at its righthand end is provided with one or more drilled holes 138 to permit of the entry and escape of lubricants. The level of lubricant in the casing 3 is normally just below the rear bearing 60. The gear sleeve 106 has one or more openings 139 drilled through the radial web thereof, as shown in Fig. 1, for the passage of lubricant from the inside to the outside thereof, particularly for the purpose of passing lubricant to the roller bearings 120.

The shifter rods 8, 9 and 10 are adapted to cooperate with the lower end of the shifter lever 140, which is mounted in a suitable universal mounting intermediate its length. The lower end of the shifter lever 140 normally lies in the notch 141 in rod 9.

Shifter rod 10 has a clutch collar 142 secured thereupon by the tapered screw pin 143 and providing a lug 144 notched as at 145 to receive the knob 146 formed in the lower end of the shifter lever 140. The forward end of the rod 9, which contains the notch 141, is milled off, or slabbed off, so as to require a minimum of lateral travel of the lower end of the shifter lever 140.

The rod 8 has a collar 147 secured by the tapered screw pin 148 and comprising a lug or body portion extending towards the shifter rod 9 providing the notch 149. The body portion 150 has a circular bore in which lies the spring pressed plunger 151, said plunger being hollow to receive the compression spring 152 to throw the plunger 151 to a definite outward position towards the left, as viewed in Fig. 4. The plunger 151 has a rim or flange 153 which lies in the counterbore 154, the rear end of the counterbore being closed by a screw plug 155. The forward or outward face of the plunger 151 extends just beyond the arm in which the notch 149 is formed, so that the gear shifter lever 140 is not able to engage in the notch 149 without displacing the plunger 151. The plunger 151 has a conical opening 156 into which a conical ended plunger pin 157 is normally forced and rests.

This pin 157 is guided in the vertical cylindrical bore 158 drilled into the body portion of the collar 147 and the spring 159 lies below the plunger pin 157. The main spring pressed plunger 151 is provided with a groove extending longitudinally thereof, and a guiding pin formed on the lower end of the screw plug 161 extends into said groove 160 and prevents turning of the main plunger 151, thereby keeping the conical recess 156 in line with the spring plunger pin 157. Now it will be apparent that the gear shift lever 40 must be pressed against the spring plunger 151 with a force not only great enough to overcome the spring pressure of the spring 152, but also to force the conical pin 157 downwardly out of the conical recess 156. This is best done by a sharp movement of the lower end of the lever 140 against the spring plunger 151 to dislodge the pin 157 and to carry the lower end of the lever 140 over into the notch 149, so that the shifter rod 8 may be moved.

Figure 6:
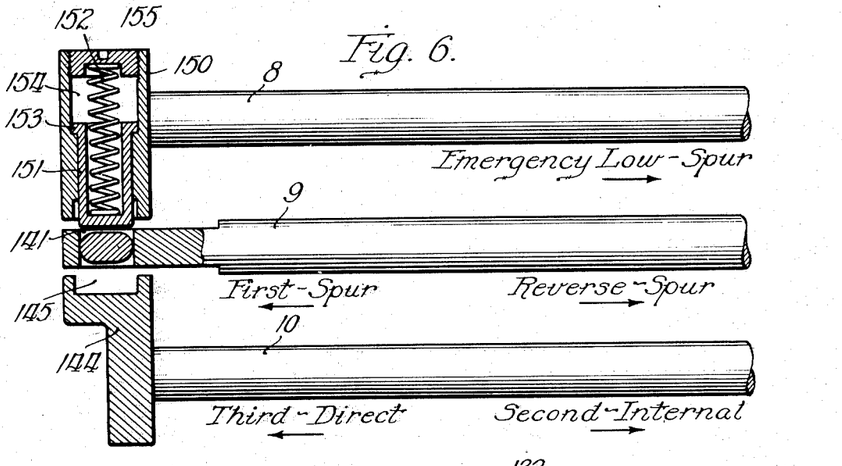
Fig. 6 is a plan view, partly in section, of the shifter rods.

In Fig. 6 I have shown the arrangement of the rods 8, 9 and 10 and have indicated by the legends the function which the movement of these rods performs. It is to be understood, however, that this arrangement of gear shifter rods and levers is not to be confined to my specific form of transmission, but may be employed for general purposes. For example, the shifter rod 8 may be employed for reverse only, and the rods 9 and 10 for first, second, third and fourth in a 4-speed transmission. The shifter rods are provided with suitable interlocks, as indicated at 163 in Fig. 1, and notches such as 164, 165 and 166 into which a spring pressed ball 167 or plunger may rest for holding the rods yieldably in predetermined position.

It will be observed that for all except emergency low, the various stages conform in position and function to standard; i. e., the motions of the shifter lever for acceleration and reverse are standard.

There are numerous modifications which will at once suggest themselves to those skilled in the art, and there are certain deviations which I contemplate within my construction, which I intend to cover broadly. For example, it is contemplated that the pinion 96 may rest upon an extension of the driving shaft 1 to comprise a hollow sleeve member containing within it splines like the splines 32 for cooperating with the splines on the intermediate shaft. In that event, the splines 104 are preferably placed at the right of the gear 96 to cooperate with the splines, such as 99, on the intermediate shaft.

The assembly of this unit is peculiarly simple and compact. The driven shaft 2 with its sleeve member 67, and internal external gear member 68 is passed through the open bore 23 and through the bore 54 and then passed through the gear 72 in the casing 3, the ball bearing 65 with its races being initially mounted on the sleeve 67. The shifter collar 133 is also mounted on the sleeve 67 before the same is passed through the shifting lever 72. The bearings 60 may then be put in place. Thereafter, the one-piece bearing bracket member 112 is mounted in the bore 54, preferably but not necessarily with the bearings 119 and 120 and the internal gear sleeve 106 in place. Thereafter the intermediate shaft 98 is passed through the pinion 96 and extended into the bearing 137 in the sleeve 67. Then the pin 131 between the collar 133 and the intermediate shaft groove 130 may be secured in place.

Thereafter, the bearing cap 17, with the shaft 1 and pinion 31 in place, is slipped over the end of the intermediate shaft 98 meshing the splines 99 and 32. When the cap 17 is drawn up in place, the flange 115 bears against the bearing bracket member 112 and forces it home.

Thereafter, the lay shaft sleeve 40, with its associated gears and pinions, is brought into the gear case through the opening in the bottom and the rod 39 pressed home. The pan 4 is then fastened over the bottom opening and the cover plate 7 containing the shifter rod is mounted on top.

The operation of the device is as follows:—

Assuming that the parts are in the condition shown in Fig. 1 and it is desired to employ the normal first speed or normal low gear drive. The shifter rod 9 is shifted to the left in Fig. 1 to mesh the gear 72 with the pinion 78 on the lay shaft sleeve 40. The drive then proceeds from shaft 1, low speed pinion 31, low speed gear 48, sleeve 40, pinion 78 to gear 73, sleeve 67 and shaft 2. Rotation of the sleeve 67 drives the internal external gear member 68, and it in turn drives the gear sleeve and the gear sleeve drives the loose pinion 96 idling.

The second stage is secured by moving the shifter rod 9 back to neutral position, as shown in Fig. 1, and shifting the shifter rod 10 to the right as viewed in Fig. 6. This carries the collar 133 and the intermediate shaft therewith to the right, causing meshing of the splines 99 with the splines 104 on the loose pinion 96.

The drive then proceeds through shaft 1, splines 32, splines 99, splines 104, to the loose pinion. The loose pinion through internal gear 107 drives the sleeve member 106. The external gear 109 of the sleeve 106 meshes with the internal gear 110 of the member 68, which is mounted on the sleeve 67, thereby driving the sleeve 67 and the shaft 2. To go to high speed or direct drive, the shafter rod 10 is moved to the left, as viewed in Fig. 1, to carry the splines 99 out of mesh with the splines 104, and thereafter to carry the splines 128 on the central part of the intermediate shaft into mesh with the splines 129 on the inside of the sleeve member 67. Direct drive then proceeds from the shaft 1 through the splines 32, splines 99, intermediate shaft 98, splines 128 to the splines 129 on the sleeve 67, and from thence through sleeve 67 to the driven shaft 2.

Reverse drive in the present case is accomplished from neutral position, as shown in Fig. 1, by moving the shifter rod 9 to the right, as viewed in Fig. 1, to bring the shiftable gear 72 into mesh with the idler 80. The drive then proceeds from drive shaft 1 through low speed pinion 31, low speed gear 48, lay shaft sleeve 40, lay shaft sleeve pinion 79, idler 80, gear 72, sleeve 67 and thence to the driven shaft 2.

Figure 4:
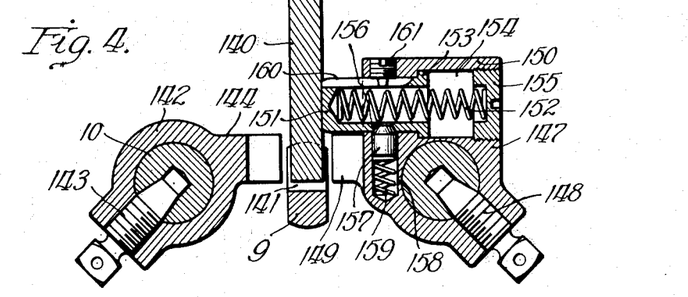
Fig. 4 is a section taken on the line 4—4 of Fig. 1.
Figure 5:
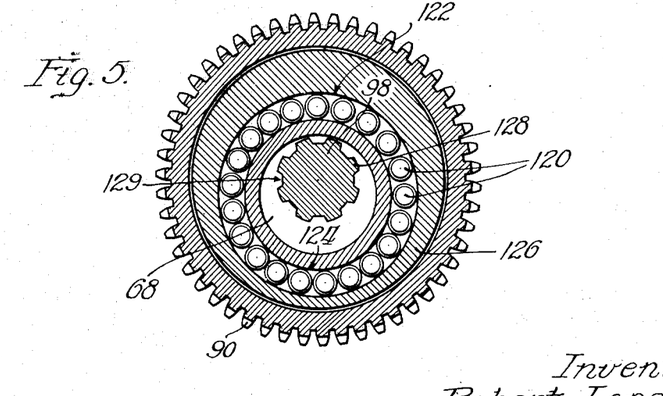
Fig. 5 is a fragmentary cross-section taken on the line 5—5 of Fig. 1.

For the emergency low, the gear shift lever at its lower end is swung sharply to the right, as viewed in Fig. 4, to engage the ball 146 in the notch 149. Thereupon, the gear shift rod 8 is moved to the right, as viewed in Fig. 1, this operating through the lever 88 and shifter finger 86 to slide the lay shaft sliding pinion 83 into mesh with the external gear 90 on the member 68.

This provides a relatively large gear reduction as follows: from the driving shaft 1, low speed pinion 31, low speed gear 48, lay shaft sleeve 40, pinion 83, external gear 90 on the member 68, thence through the sleeve 67 and shaft 2.

By way of example, the pinion 31 may have eighteen teeth and the low speed gear may have thirty-five teeth. Emergency low speed pinion 83 may have eighteen teeth and the external gear 90 may have thirty-five teeth. This provides a drive of 3.781 rotations of shaft 1 to 1 rotation of shaft 2. Also, by way of example, the gear 78 may have twenty-four teeth and the shiftable gear 72 may have twenty-nine teeth. This provides a normal first speed reduction of 2.3495 rotations of the shaft 1 to 1 rotation of the shaft 2. The reverse pinion 79 may, for example, have nineteen teeth providing thereby a reverse drive of 3.02 revolutions of the shaft 1 to 1 revolution of the shaft 2. The internal gear drive may be arranged to give a ratio of approximately 1.4 to 1.6 revolutions of the shaft 1 to 1 revolution of the shaft 2. Considerable latitude is allowed by my design for the ratio of the double internal drive.

It will be apparent that the construction is compact, efficient and inexpensive to manufacture and assemble.

Lubrication is adequately accomplished throughout, first, by maintaining a bath of oil to a level indicated at Fig. 2 and dependent primarily upon the carrying of lubricant by the low speed gear 48 to the low speed pinion 31 where the oil is stripped from the gear 48 as it enters through passageway 50 by the meshing of the low speed pinion 31 with the gear 48, forcing the lubricant up into the chamber 30. From here it is distributed laterally, first to the left through the ball bearings 26, and thence down through the chamber 35 and drain passageway 36. At the same time, oil is forced to the right through the bearings 119 into the space occupied by the external gear 109 and from thence it finds its way into the bearings 120. At the same time, oil is forced between the sleeve member 106 and the loose pinion 96 and some of it will be thrown out through the passageway 139 into the bearings 120 and into the internal gear 110 which meshes with gear 109.

Oil will be forced through the passageway 102, through the loose pinion 96, into the bearing of the bushing 100 upon the intermediate shaft 98.

The external gear 90 is lubricated by its mesh with the shiftable pinion 83 which drips into the bath of oil.

So long as the oil level is high, the gear 72 dips into the same, and when in mesh also receives oil from the pinions 78 or the idler 80 in reverse. If the oil level is low, oil is thrown by the pinion 78. Sufficient lubricant is passed through the slot 132 to maintain the bushing 137 in lubricated condition. The movement of the intermediate shaft endwise also tends to work oil in and out by the pumping action of the closely fitting parts.

In manufacturing the bracket bearing member 112 it will be observed that there is an outer cylindrical surface by which the member may be gauged and chucked for cutting the concentric groove in which the internal gear member 68 lies.

While the space for the internal gear member 68 is shown as a groove within the back face of the block 112, it is to be understood that the metal lying outside of the groove may be cut away if desired. Obviously, however, for strength and to improve the area of mounting the relatively thin annular flange which remains is advantageous but not essential. Any part or all of it may be cut away.

It will be apparent that I need not employ the anti-friction roller bearings 119 and 120, but that plain cylindrical bearings with or without bronze bushings or the like may be employed for mounting the gear sleeve 106. If plain cylindrical bearings are employed it will be necessary, of course, to make the larger bearing corresponding to the rollers 119 of a diameter not smaller than the external gear portion 109 so that the gear sleeve member 106 may be introduced from the left as viewed in Fig. 1. The cylindrical bearing surface 121 might be the same size as the middle bore in which the external gear portion 109 of the gear sleeve 106 is mounted.

By recessing the inside of the gear member 68 it is possible to provide a larger bearing ring 126 and even increase the same to a size where separate bearing races can be employed.

The same principle of employing an arm for supporting the bearing bracket member 126 through the crescent-shaped space between the internal gear member 68 and the sleeve member 126 may be employed if desired by extending an arm through the space between the sleeve member 106 and the loose pinion 96 to support the intermediate shaft or the internal gear member.

Where I have shown double ball bearings 26, 66 and 60, single ball bearings or plain cylindrical bearings may be employed if desired.

Figure 7:
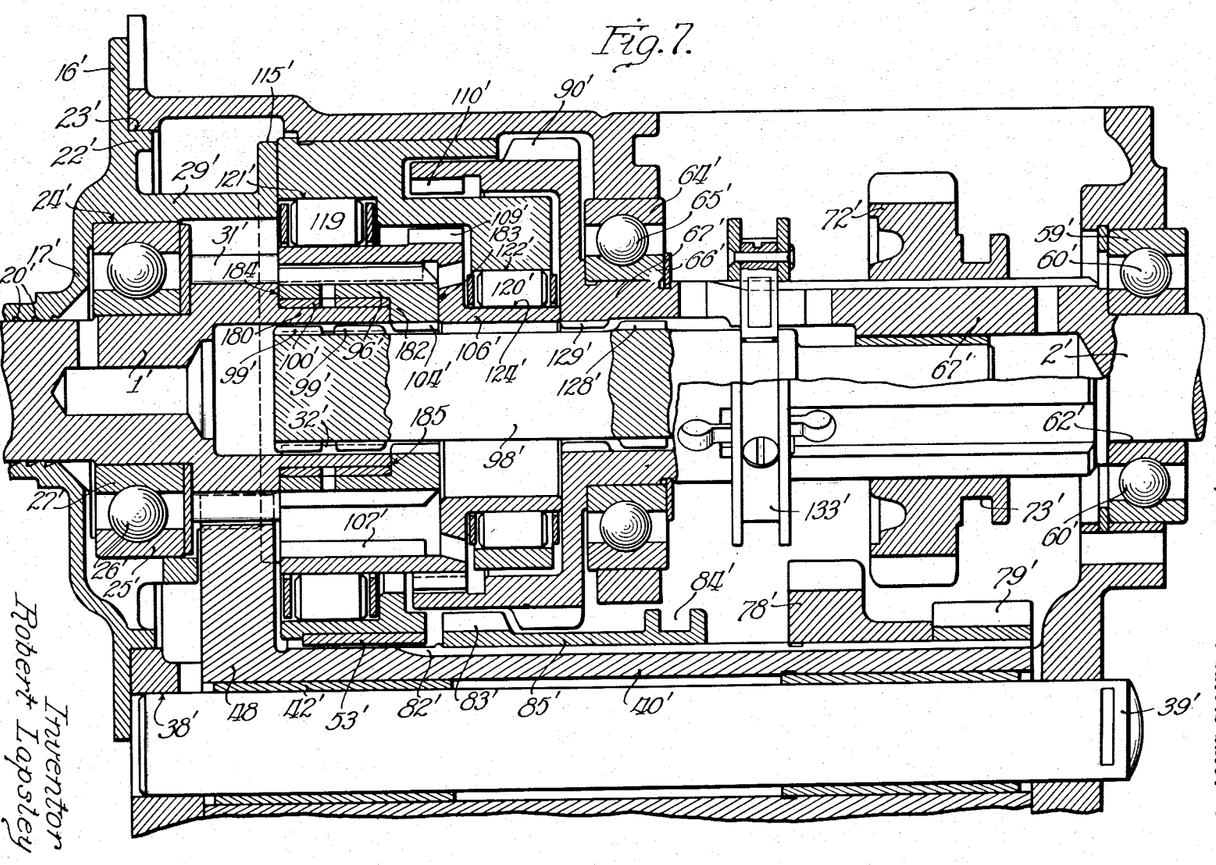
Fig. 7 is a fragmentary longitudinal vertical section through another embodiment of the invention.

The transmission illustrated in Fig. 7 is, generally, the same as that illustrated in Fig. 1 with the exception that the pinion 96' for the first internal gear 107' is supported adjacent and at the same time free or independent of the shiftable intermediate shaft section 98'. This is accomplished in the embodiment shown by providing the low speed pinion 31' with a rearwardly extending neck 180 and mounting the bushing 100' upon this neck 180 and the pinion 96' upon the bushing 100'. In this case the splines or teeth 104' on the inside of the pinion 96' are at the rear end of the pinion 96' and there is an annular inwardly extending rim or flange 182 which carries these splines 104' and which is interposed between the rear ends of the neck 180 and bushing 100' and the forwardly facing shoulder or abutment 183 of the internal external gear sleeve 106'. The forward end of the pinion 96' is shown as abutting the rearwardly directed face 184 of the low speed pinion 31', but it is to be understood, of course, that there may be a slight clearance at this point or there may be a slight clearance between the internal and forwardly directed annular shoulder 185 of the pinion 96' and the adjacent ends of the neck 180 and bushing 100'.

From the foregoing it will be apparent that in the embodiment of Fig. 7 the pinion 96' is supported adjacent and at the same time free or independent of the shiftable shaft section 98'.

The shiftable shaft section 98' has splines at its forward end meshing at all times with the splines 32' on the inside periphery of the hollow part of the driving shaft 1', as before, and splines 128' on the shaft section 98' are also adapted to engage cooperating splines 129' on the inside of the sleeve member 67', as before. The shifter collar 133' corresponds to the shifter collar 133 of Fig. 1, and the other elements of Fig. 7 which correspond with like elements in Fig. 1 are indicated by primed reference characters corresponding thereto.

Figure 8:
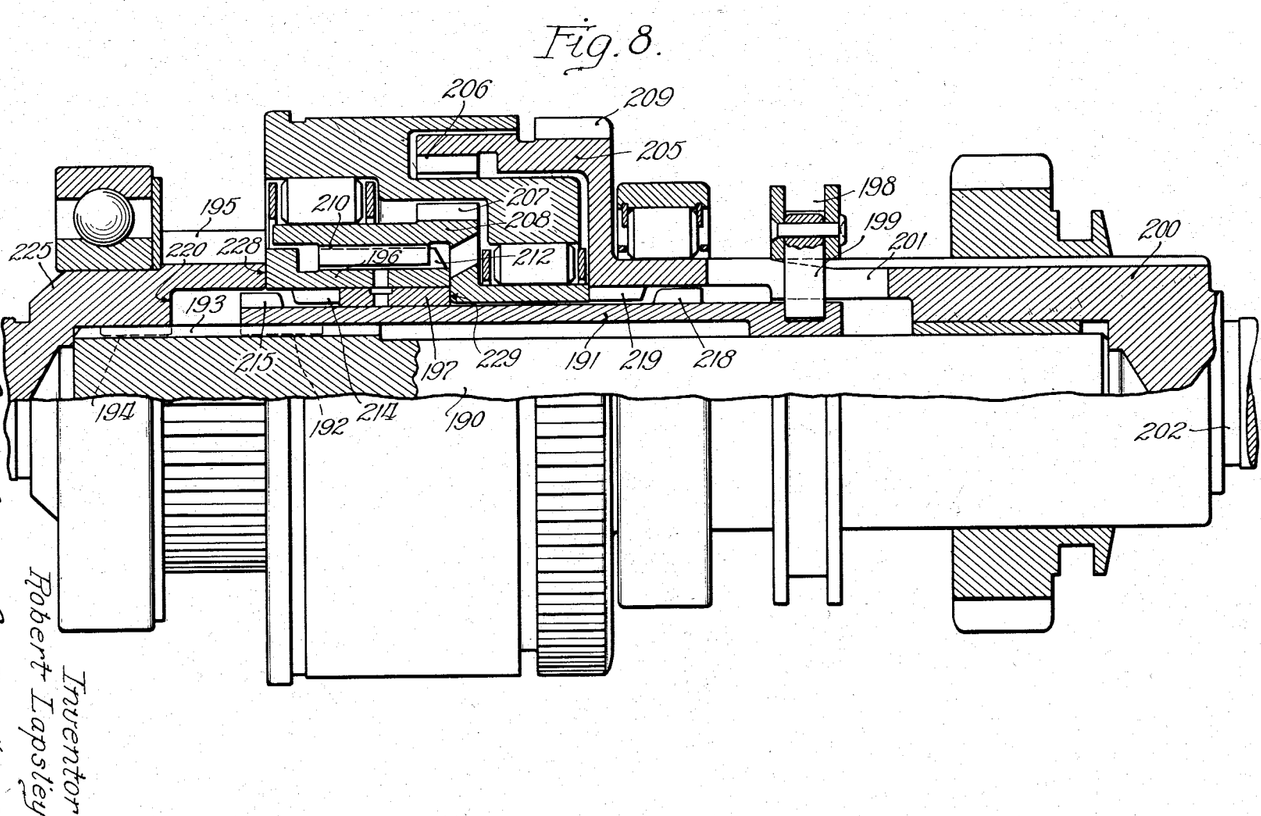
Fig. 8 is a longitudinal vertical section and partially in elevation through another embodiment with the casing omitted.

In the embodiment of Fig. 8 instead of the entire shaft section 98' being shiftable, this shaft section, which is indicated in this figure at 190, is surmounted by a longitudinally shiftable sleeve 191 provided at its forward end with internal splines 192 meshing at all times with the splines 193 on the shaft section 190, these splines 193 in turn meshing at all times with the splines 194 formed on the inside periphery of the low speed pinion 195, which pinion 195 corresponds with the pinion 31 of Fig. 1. In this case the pinion 196, which corresponds with the pinion 96 of Fig. 1, is journaled upon the connecting sleeve 191 which is preferably cylindrical. The pinion 196 is mounted upon the bushing 197 which is in turn mounted upon the shiftable connecting sleeve 191. The sleeve 191 is shifted by a collar 198 which corresponds with the collar 133 of Fig. 1 and which is provided with suitable means 199 reaching from the outside of the tubular sleeve 200 through a longitudinal slot 201 therein and engaging the adjacent end of the sleeve 191 for shifting same from the collar 198.

The tubular sleeve 200 forms an extension of the driven shaft 202, as before and also, as before, bears at its inner end the internal external gear member 205. The internal teeth 206 of this gear member mesh with the external teeth 207 of the internal external gear sleeve 208 which corresponds with the sleeve 106 of Fig. 1. The external teeth 209 of the member 205 are adapted to mesh with the shiftable pinion on the lay shaft (not shown) and the internal teeth 210 of the member 208 mesh with the external teeth 212 of the driving pinion 196. This pinion 196 is provided with internal splines 214 which are adapted to be engaged by the splines 215 on the forward end of the shiftable connecting sleeve 191, and rearwardly the connecting sleeve 191 has splines 218 which are adapted to engage cooperating splines 219 formed on the inside of the sleeve member 205. The pinion 195 is recessed internally at 220 to permit the forward shifting of the sleeve 191 necessary to engage the splines 218 with the splines 219, and the splines 215 are engaged with the splines 214 by rearward shifting of the sleeve 191 with an accompanying disengagement of the splines 218 from the splines 219.

The different speed changes or stages of operation are substantially the same as described in connection with Fig. 1, and will not, therefore, be further described in detail again. Suffice it to say that when the splines 215 are engaged with the splines 214 the pinion 196 is keyed directly to the driv part 225 and transmits the drive through the internal external mechanism and when the splines 218 are in engagement with the splines 219, the drive and driven parts 225 and 202 a1 connected directly together.

The pinion 196 is shown as being positioned between the rearwardly directed face 228 of the pinion 195 and the forwardly directed shoulder or face 229 of the sleeve member 208 with the rear end of the bushing 197 also abutting the shoulder or face 229 and the splines 214 disposed between the forward end of the bushing 197 and the splines 215.

Figure 9:
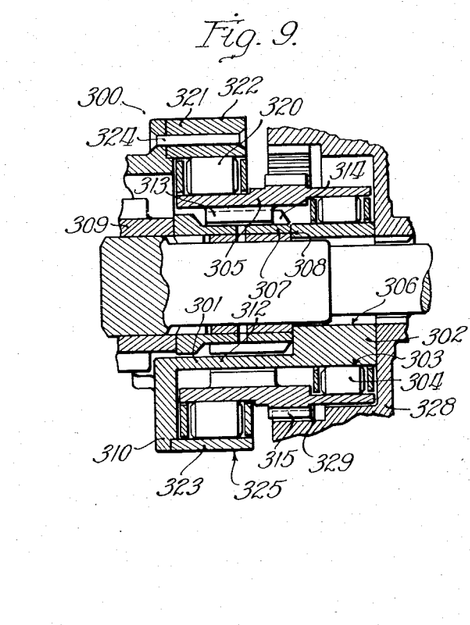
Fig. 9 is a fragmentary longitudinal vertical section through another embodiment of the invention.
Figure 10:
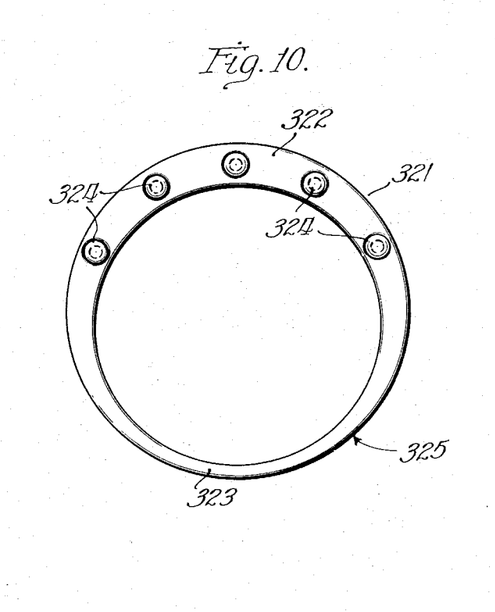
Fig. 10 is a view of the inner or rearwardly directed end of the forward eccentric bearing ring of Fig. 9, showing the attachment of said ring to the cap of the casing.

In the embodiment of the invention illustrated fragmentarily in Figs. and 10, instead of having a bracket member for providing an eccentric bearing for the eccentric driving sleeve, the cap 300, which corresponds with the cap 16 of Fig. 1, has an inwardly projecting integral hub 301 having at its inner end 302 a finished cylindrical external surface 303 for the roller bearings 304 which form an internal roller bearing support for the inner end of the eccentric driving sleeve 305 instead of an external bearing for said sleeve as in the previous embodiments. The internal bore 306 of the inner end of the hub 301 is preferably concentric with the cap 300, or with the opening in the case (not shown), in which said cap is mounted, and the pinion 307, which corresponds with and is mounted similar to the pinion 96 of Fig. 1 is held endwise between the internal circular shoulder 308 of the hub 301 and the low speed pinion 309 which corresponds with the low speed pinion 31 of Fig. 1. Between the inner end 302 and the flanged portion 310 of the cap 300, the hub 301 has an upwardly opening crescent-shaped portion 312 and the upwardly opening top of this crescent-shaped portion 312 permits the internal teeth 313 of the driving sleeve 305 to engage the teeth 314 of the pinion 309.

At the bottom, the sleeve 305, due to its eccentricity, passes around the outside of the bottom portion of the hub wall 301, as shown, and at 315 the sleeve 305 is provided with external teeth corresponding with the external teeth 109 of the embodiment shown in Fig. 1. The front end of the sleeve 305 is supported externally by roller bearings 320 which are in turn supported in the eccentric opening of a race or ring 321, which is generally crescent or moon-shaped, continuous circumferentially, and with its thicker portion 322 at the top and its thinner portion 323 at the bottom. The race 321 may be secured to the flanged portion 310 of the cap 300 by means of rivets 324 or in any other suitable or preferred manner. The race 321 may provide a cylindrical external surface 325 concentric with the opening in the case in which the cap 300 is mounted. The internal gear 328 has teeth 329 meshing with the teeth 315 of the sleeve 305 and is connected with the driven shaft as before.

I do not intend to be limited to the details shown and described.

I claim:—

1. A unitary bearing frame comprising a cylindrical peripheral face and having at one end an eccentric bore providing an eccentric internal bearing surface at said one end, and having a counterbore coaxial with and communicating with said eccentric bearing, there being an eccentric bore at the other end coaxial with and extending from said counterbore and providing an eccentric bearing surface, there being a relatively deep concentric groove at said latter end close to the outer periphery, said groove intersecting said counterbore.

2. A unitary bearing frame comprising a circular block of metal having a deep groove or channel cut into the back face concentric with the circular periphery, said block having a stepped bore eccentric to the circular periphery, said eccentric stepped bore comprising three coaxial steps of progressively less diameter, the groove or channel embracing the smaller of the three steps and intersecting the middle step, the inner and outer steps of the eccentric bores forming bearings.

3. A bearing bracket comprising a cylindrical block of metal having a deep circular recess cut in one end face thereof, said block having an eccentric cylindrical bore therethrough, said bore comprising a part of larger diameter and a part of smaller diameter, said circular recess intersecting the part of the bore which is of larger diameter, the part of smaller diameter providing a bearing surface.

4. A bearing bracket comprising a cylindrical block of metal having an eccentric bore providing a bearing, an arm of curved cross-section extending from an end face of said block, and a bearing ring integral with said arm having a bore coaxial with said first bore.

5. In a transmission having a pinion, and a gear meshing therewith, a gear member, a bearing bracket embracing said gear member and provided interiorly with bearing means for supporting said member therein, and a housing for lubricant disposed about the pinion and extending to points adjacent said gear and to the bearing bracket to deliver lubricant directly to the bearing means for said gear member.

6. In a transmission, a driving shaft, a driven shaft, a casing having a bearing support at one end for one of the shafts, a plate member at the other end of said casing and provided with bearing means for the other shaft, a bracket on the casing having a bore coaxial with the shafts, an eccentric gear sleeve for transmitting motion from the driving to the driven shaft, a bracket member seated in said latter bore and providing a bearing for said eccentric gear sleeve, said bracket member having a flange abutting against said bracket, and means on said plate member for positioning said bracket member with the flange thereof against said bracket.

7. In combination, a driving shaft and a driven shaft in endwise alinement, means for clutching the driving and driven shafts for direct drive, a pinion adapted to be driven by the drive shaft, an internal gear mounted on the driven shaft and an eccentric sleeve gear having internal teeth cooperating with the pinion and external teeth cooperating with the internal gear, and providing a crescent-shaped opening between said sleeve and internal gears, said sleeve having a bearing portion at one end of reduced diameter, a mounting bracket having a bearing ring embracing said portion of reduced diameter to support said end of the sleeve, and an arm for said bearing ring extending through the crescent-shaped opening between the eccentric sleeve and the internal gear.

8. In combination, a transmission casing, a driving shaft and a driven shaft journaled for rotation in alinement therein, an intermediate shaft for connecting said driving and driven shafts for direct drive, a driving sleeve embracing the intermediate shaft, an internal gear connected to the driven shaft, said driving sleeve being mounted eccentrically of the internal gear and having external gear teeth meshing with the teeth of the internal gear, a bearing support for the driving sleeve embraced by the internal gear, and an intermediate wall carried by said casing adjacent said internal gear for rotatably supporting the latter.

9. In combination, a driving shaft, a driven shaft, a pinion for the driving shaft, an internal gear for the driven shaft, means for clutching the shafts together for direct drive, an eccentric gear sleeve having internal teeth meshing with the pinion and external teeth meshing with the internal gear, there being a crescent-shaped opening between said external teeth and internal gear, a bearing bracket having a bearing ring embracing the end of the bearing sleeve and being in turn embraced by the internal gear, an arm extending from said bearing ring through the crescent-shaped space between the internal gear and the eccentric sleeve, said bearing bracket having a second bearing ring for the end of the sleeve adjacent the pinion.

10. A bearing bracket member comprising a cylindrical block of metal having an eccentric bore providing an anti-friction bearing race, an arm integral with said block extending from an end face thereof and having an integral eccentric bearing ring providing an anti-friction bearing race coaxial with said first named race, a gear sleeve member having external bearing surfaces registering with the aforesaid bearing surfaces, anti-friction bearings between the gear sleeve and the bracket member, said gear sleeve having external gear teeth lying between said bearing surfaces, and an internal gear member embracing said arm and said second bearing ring and meshing with the external teeth of the gear sleeve member.

11. In combination, a driving shaft having a pinion, a driven shaft having an internal gear, an eccentric gear sleeve having internal gear teeth meshing with the pinion and external gear teeth meshing with the internal gear, there being a crescent-shaped opening between said external gear teeth and the internal gear, the end of the gear sleeve extending inside and being embraced by the internal gear, a bearing support providing a first bearing for the gear sleeve member, said bearing support having an arm extending through the crescent-shaped space between the eccentric gear sleeve member and the internal gear, said arm having a bearing for supporting the end of the sleeve within the internal gear.

12. In combination, a gear case having a series of coaxial bores, a driving and driven shaft coaxial with said bores and having bearings therein, a cylindrical bearing bracket member disposed within one of said bores, said cylindrical bracket member having circular bearing surfaces therein eccentric to its cylindrical outer surface, an eccentric gear sleeve having bearing surfaces cooperating with the aforesaid bearing surfaces, the bearing surfaces of said sleeve being disposed at opposite ends thereof, a driving pinion embraced by said sleeve and providing a crescent-shaped space therebetween, said sleeve having internal gear teeth cooperating with the pinion, an internal gear mounted on the driven shaft, the sleeve having external gear teeth cooperating with the gear teeth of the internal gear and the bearing supporting bracket extending through the crescent-shaped space between the sleeve and the internal gear.

13. In combination, a gear case having a series of coaxial bores, a driving shaft a bearing cap fitting in one of the bores of the casing and having bearings for supporting the driving shaft, a bearing supporting bracket member mounted in another one of said bores in the casing, said bearing bracket member having bearings therein, a gear sleeve mounted in said bearings, said bearing cap having a flange engaging said bearing support member to maintain the same in position, a pinion on the driving shaft and a gear meshing therewith, said gear being mounted in the lower part of the casing and adapted to carry lubricant from the lower part of the casing to the pinion, said flange being disposed about the pinion and forming a housing adapted to trap lubricant and force the same into the bearings for the gear sleeve.

14. In combination, a driving shaft having a low speed pinion, a lay shaft having a low speed gear meshing therewith, a driven shaft, a double internal gear connection for connecting the driving shaft and the driven shaft and comprising a loose pinion adjacent the low speed pinion and an eccentric gear sleeve cooperating with the loose pinion, a bearing bracket member for the eccentric gear sleeve, a bearing cap for the driving shaft providing a bearing for the driving shaft adjacent the low speed pinion, said bearing cap having a circular flange extending partially around the low speed pinion and on one end in close proximity to the low speed gear on its retreating side, said flange having an extension spaced away from the advancing side of the low speed gear to provide a passageway for the entrance of lubricant as carried by the low speed gear, said flange extending to the bearing bracket member and providing a housing adapted to trap lubricant, said housing communicating with the inside and outside of the gear sleeve.

15. In a transmission, a driving shaft and a driven shaft and an intermediate shaft for coupling or uncoupling driving or driven shafts to and from each other, an internal gear on the driven shaft, a loose pinion adapted to be connected to the driving shaft and an eccentric gear sleeve having internal and external teeth cooperating with the loose pinion and the internal gear respectively, a low speed pinion for the driving shaft, a lay shaft having a low speed gear meshing with the low speed pinion, a low speed pinion fixed on the lay shaft and a reverse pinion also fixed on the lay shaft, an idler meshing with the latter pinion, a sliding gear mounted on the driven shaft and adapted to be meshed with the idler for reverse or with the low speed lay shaft pinion, an emergency low speed pinion mounted slidably on the lay shaft and a low speed external gear mounted on the internal gear of the driven shaft.

16. In a transmission employing an eccentric gear sleeve, a pinion, a lay shaft gear, said latter gear being disposed below the pinion, a casing for containing lubricant about the gear, a housing extending about the pinion and having a restricted outlet on the retreating side of the gear and having an entrance passageway on the advancing side of the gear to carry lubricant into the housing, said housing communicating with the gear sleeve for the delivery of lubricant thereto.

17. In a transmission employing an eccentric gear sleeve, a pinion, a lay shaft gear, said latter gear being disposed below the pinion, a casing for containing lubricant about the gear, a housing extending about the pinion and having a restricted outlet on the retreating side of the gear and having an entrance passageway on the advancing side of the gear to carry lubricant into the housing, said housing communicating with the gear sleeve for the delivery of lubricant thereto, said sleeve having passageways from the inside to the outside thereof for conveying lubricant by centrifugal action to the external bearings and internal gear teeth of said gear sleeve.

18. In combination, a driving shaft, a driven shaft, an internal external gear driving unit between said shafts and including a set of external teeth and a meshing set of internal teeth disposed eccentrically with respect to said external teeth with the pitch circle of said internal teeth tangent to the pitch circle of said external teeth with a crescent-shaped space between the teeth and a bearing part having a portion extending through the crescent-shaped opening between said teeth, and providing a support for one end of said driving unit.

19. In combination, a driving shaft, a driven shaft, an internal external gear driving unit between said shafts and including a set of external teeth and a meshing set of internal teeth disposed eccentrically with respect to said external teeth with the pitch circle of said internal teeth tangent to the pitch circle of said external teeth with a crescent-shaped space between the teeth, a bearing part having a portion extending through the crescent-shaped opening between said teeth, a driving sleeve carrying one of said sets of teeth, and bearing supports for the opposite ends of said sleeve disposed eccentrically with respect to said driving shaft.

20. In combination, a driving shaft, a driven shaft, an internal external gear driving unit between said shafts and including a set of external teeth and a meshing set of internal teeth disposed eccentrically with respect to said external teeth with the pitch circle of said internal teeth tangent to the pitch circle of said external teeth with a crescent-shaped space between the teeth, a bearing part having a portion extending through the crescent-shaped opening between said teeth, a driving sleeve carrying one of said sets of teeth, bearing supports for the opposite ends of said sleeve disposed eccentrically with respect to said driving shaft, one of said bearing supports including a ring having an external cylindrical surface concentric with respect to said driving shaft and an inner bore eccentric with respect thereto.

21. A unitary bearing frame comprising a stepped cylindrical peripheral surface having at one end a cylindrical portion larger in diameter than the cylindrical portion at the other end, and a bore at each end of said frame eccentric with respect to the cylindrical surface at that end, thereby providing an eccentric internal bearing surface at each end of said bearing frame.

22. A unitary bearing frame comprising a cylindrical peripheral face, an eccentric bore at one end of said frame providing an eccentric internal bearing surface at said one end, and a second eccentric bore at the other end of said frame of larger diameter than said first eccentric bore and forming a continuation thereof, said second eccentric bore providing an eccentric internal bearing surface at said other end of the bearing frame.

23. A unitary bearing frame comprising a circular block having a deep groove or channel cut into one face concentric with the circular periphery thereof and a stepped bore eccentric with respect to the circular periphery.

24. A unitary bearing frame comprising a circular block having at one end a deep groove or channel concentric with the circular periphery of the block and a stepped bore eccentric to the circular periphery and comprising at least two steps of unequal diameter, the groove or channel intersecting the portion of the eccentric bore having the larger diameter.

25. A unitary bearing frame comprising a circular block of metal having its cylindrical external periphery formed of cylindrical portions of unequal diameter, said cylindrical portions being concentric, said block having a stepped internal bore eccentric with respect to the circular periphery of the block and comprising at least two steps of unequal diameter, the amount of eccentricity and the difference of diameters being such that a portion of the larger eccentric bore intersects a portion of the smaller cylindrical periphery of the circular block.

26. A bearing bracket comprising a cylindrical block of metal having a deep circular recess cut in one end face thereof, said block having an eccentric cylindrical bore therethrough, said bore comprising a part of larger diameter and a part of smaller diameter, said circular recess intersecting the part of the bore which is of larger diameter, and a bearing surface formed at each end of said eccentric cylindrical bore.

27. A bearing bracket member for a gear sleeve, said bracket member comprising a cylindrical block of metal having an eccentric bore providing an anti-friction bearing ring, and an arm integral with said block extending from an end face thereof and having an integral eccentric bearing ring providing an anti-friction bearing ring coaxial with said first named ring.

28. A bearing bracket member comprising a cylindrical block having an eccentric bore providing a bearing surface, an arm projecting in a direction away from an end face thereof and extending longitudinally of the block, and a bearing ring having an interior eccentric bearing surface coaxial with respect to said first named surface, said ring being spaced from said block at a point opposite said arm.

29. A bearing bracket comprising a cylindrical block having a bore providing a bearing race, an arm portion extending from said block in a generally axial direction, and a bearing ring carried by said arm and spaced from said cylindrical block, said bearing ring having a bearing surface coaxially disposed with respect to the bearing surface on said block.

30. In combination, a bearing bracket member comprising a cylindrical block having a bore therein providing a bearing race, an arm projecting in a generally axial direction, a bearing ring carried by said arm and provided with a bearing surface coaxial with respect to the bearing surface first mentioned, a gear sleeve member having bearing surfaces respectively cooperating with the bearing surfaces on said block and bearing ring, and gear teeth formed on said sleeve member and disposed substantially midway between the bearing surfaces on said sleeve member.

31. A transmission comprising a casing, driving and driven shafts therein, said casing having end walls and a pair of intermediate integral brackets, there being coaxial bores in the lower portions of said end walls of equal diameter and coaxial bores in the upper portions of said walls and in said brackets, said last named coaxial bores being of progressively varying diameters, the lower of said bores receiving certain of said shafts and the upper bores receiving others of said shafts.

32. In a transmission comprising a casing, driving and driven shafts journaled in said casing in coaxial relationship, bearing means supporting said shafts for rotation, and a plurality of coaxial bores in said casing accommodating said bearing means, a closure cap associated with one of said bearing means and adapted to be seated in one of said coaxial bores of the casing, a driving connection between said shafts including an eccentric driving sleeve, and means carried by said closure cap for holding said driving sleeve in eccentric relation with respect to the axis of said bores and said shafts.

33. In a transmission comprising a casing having a plurality of bores disposed in coaxial relationship, the combination of a driving and a driven shaft disposed in said bores, means supporting said shafts therein, a driving pinion having an elongated hub portion carried by said driving shaft, a second pinion rotatably supported upon said hub portion, an eccentric driving sleeve having cylindrical portions of unequal diameter, the larger portion of said sleeve embracing said rotatable pinion and provided with gear teeth meshing therewith, a bearing support for said eccentric sleeve member for supporting the same in eccentric relation with respect to the axis of said pinions, said bearing support being disposed in one of said coaxial bores and provided with bearing means cooperating with the larger cylindrical portion of said driving sleeve, and means connecting said driving sleeve with said driven shaft.

ROBERT LAPSLEY.